(12) United States Patent
Jung

(10) Patent No.: US 8,558,938 B2
(45) Date of Patent: Oct. 15, 2013

(54) CAMERA MODULE AND MANUFACTURING METHOD THEREOF

(75) Inventor: Younback Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 406 days.

(21) Appl. No.: 12/892,620

(22) Filed: Sep. 28, 2010

(65) Prior Publication Data

US 2011/0085072 A1 Apr. 14, 2011

(30) Foreign Application Priority Data

Sep. 28, 2009 (KR) ........................ 10-2009-0091729

(51) Int. Cl.
*H04N 5/225* (2006.01)
*H01L 31/0203* (2006.01)

(52) U.S. Cl.
USPC ............................ 348/340; 348/374; 257/434

(58) Field of Classification Search
None
See application file for complete search history.

(56) References Cited

U.S. PATENT DOCUMENTS

| | | | |
|---|---|---|---|
| 2004/0109079 A1* | 6/2004 | Fujimoto et al. | 348/340 |
| 2005/0168846 A1* | 8/2005 | Ye et al. | 359/819 |
| 2005/0219398 A1* | 10/2005 | Sato et al. | 348/340 |
| 2005/0270403 A1* | 12/2005 | Adachi et al. | 348/340 |
| 2006/0202293 A1* | 9/2006 | Bogdan et al. | 257/432 |
| 2009/0008732 A1* | 1/2009 | Kojima | 257/434 |
| 2009/0079863 A1* | 3/2009 | Aoki et al. | 348/374 |

* cited by examiner

*Primary Examiner* — Justin P Misleh
(74) *Attorney, Agent, or Firm* — Saliwanchik, Lloyd & Eisenschenk

(57) ABSTRACT

Disclosed is a camera module and a manufacturing method thereof, wherein the camera module includes a PCB (Printed Circuit Board) mounted with an image sensor, a holder fixed at the PCB, with one side formed with an optical transmission hole and the other side being opened, one or more lenses to be inserted into the holder, and a fixture ring to be inserted into the holder and fixed at an image sensor for fixing one or more lenses, whereby occurrence of defect caused by introduction of foreign objects during assembly of camera module can be minimized, and structure of camera module can be simplified to facilitate the assembling process and to reduce the assembling time.

15 Claims, 3 Drawing Sheets

CAMERA MODULE AND MANUFACTURING METHOD THEREOF

CROSS-REFERENCE TO RELATED APPLICATION

This application claims the benefit under 35 U.S.C. §119 of Korean Application No. 10-2009-0091729, filed Sep. 28, 2009, which is hereby incorporated by reference in its entirety.

BACKGROUND OF THE DISCLOSURE

1. Field of the Invention

The present disclosure relates to an integrally-formed camera module and a manufacturing method thereof.

2. Description of Related Art

As illustrated in FIG. 1, a camera module generally includes a lens barrel 12 including a lens, a holder 13, an IR (Infra-red) filter 14, an image sensor 15 and a PCB (Printed Circuit Board). The camera module receives an optical image of an object via a lens, transmits the optical image to IR filter 14, where the IR filter 14 interrupts the infra-red from the received optical image and sends the infra-red removed image to the image sensor 15, and where the image sensor 15 converts the irradiated optical image to an electrical signal.

At this time, the lens assembled on the lens barrel 12 is configured to perform a focusing work to obtain a most clear image by focusing through distance adjustment with the image sensor 15. That is, threaded units are formed at a coupling area between the lens barrel 12 and the holder 13 so that the lens barrel 12 and the holder 13 are coupled by threaded coupling, thereby enabling a simplified focusing work and performing a fine adjustment and then some.

However, the conventional screw-coupled camera module may create the following disadvantages if tension force between a threaded part of the lens barrel 12 and that of the holder 13 is inappropriate, because the focusing work is performed by rotating and coupling, by an operator, the lens barrel 12 using a device.

First, in a case the tension force is low, an appropriate tension force between the lens barrel 12 and the holder 13 cannot be maintained to generate an image defocus due to random rotation of the lens barrel 12 during the coupling process (hook-up) between the lens barrel 12 and the holder 13, whereby the hook-up becomes loose to loosen the threaded coupling and to decrease the resolution.

Conversely, in a case the tension force is high, image defects are generated by foreign objects generated by friction between threaded parts, although focusing may be performed by rotating the lens barrel 12 due to high tension force in a case the tension force is high.

Another disadvantage is that supply efficiency of good quality parts drastically decreases due to an inevitable presence of deviation between cavities, in a case a formability-deprived design is applied due to tendency of lightweight and slim camera module and introduction of multi-cavity for enhancing a productivity, because the lens barrel 12 and the holder 13 are currently injection-molded using plastic injection mold.

Lastly, in a case the lens barrel 12 and the holder 12 are fixed using an adhesive, the adhesive is leaked out to the outside to form a protrusion (A), rendering an exterior look to be unbecoming.

BRIEF SUMMARY

The present disclosure is to provide a camera module configured to minimize generation of defects caused by introduction of foreign objects during assembly of camera module, to simplify structure of the camera module for convenient assembly and to reduce an assembly time, and a manufacturing method thereof.

The present disclosure is to provide a camera module configured to prevent incapability of work and twisted focus caused by defect in hook-up, to dispense with separate need of focus adjusting due to assembly to meet a pre-designed optical distance, and to reduce the manufacturing cost due to reduced number of parts, and a manufacturing method thereof.

Technical subjects to be solved by the present disclosure are not restricted to the above-mentioned description, and any other technical problems not mentioned so far will be clearly appreciated from the following description by the skilled in the art.

In one general aspect of the present disclosure, a camera module is provided, the camera module comprising: a PCB (Printed Circuit Board) mounted with an image sensor; a holder fixed at the PCB, with one side formed with an optical transmission hole and the other side being opened; one or more lenses to be inserted into the holder; and a fixture ring to be inserted into the holder and fixed at an image sensor for fixing one or more lenses.

In some exemplary embodiments of the present disclosure, the holder may be provided inside with a lens mounting unit for mounting the lenses, and a fixture ring mounting unit for mounting the fixture ring.

In some exemplary embodiments of the present disclosure, the lens mounting unit may include a first lens mounting unit, and a second lens mounting unit having a minor diameter larger than that of the first lens mounting unit.

In some exemplary embodiments of the present disclosure, the lens mounting unit may take the shape of a circle, while the fixture ring mounting unit may take the shape of a polygon.

In some exemplary embodiments of the present disclosure, the fixture ring mounting unit may be provided thereunder with an image sensor accommodator having a minor diameter larger than that of the fixture ring mounting unit to encompass the image sensor.

In some exemplary embodiments of the present disclosure, the lens may include a first lens and a second lens to be inserted into the first lens mounting unit, and a third lens to be inserted into the second lens mounting unit.

In some exemplary embodiments of the present disclosure, an upper external surface of the fixture ring may take the shape of a circle so as to be inserted into the lens mounting unit, and a lower external surface of the fixture ring may take the shape of a polygon so as to be inserted into the fixture ring mounting unit.

In some exemplary embodiments of the present disclosure, the holder and the fixture ring may be fixed by adhesive.

In some exemplary embodiments of the present disclosure, the fixture ring mounting unit of the holder may be formed at a lower end thereof with a tapered-off infusion unit for pouring in the adhesive.

In some exemplary embodiments of the present disclosure, the fixture ring may include an IR (Infrared) filter.

In some exemplary embodiments of the present disclosure, the image sensor may be formed at an upper surface thereof with a contact surface on which a lower end of the fixture ring is fixed by the adhesive.

In some exemplary embodiments of the present disclosure, a focal length between the lens and the image sensor may be determined by a length of the fixture ring, a thickness of the image sensor and a thickness of contact surface coated on an upper surface of the image sensor.

In another general aspect of the present disclosure, a manufacturing method of a camera module is provided, the method comprising: inserting one or more lenses into a lens mounting unit of a holder; fixing a lens by inserting a fixture ring into a fixture ring mounting unit of the holder; and fixing the fixture ring at the image sensor and fixing the holder at a PCB (Printed Circuit Board).

In some exemplary embodiments of the present disclosure, the step of inserting a lens may include inserting a first lens and a second lens into a first lens mounting unit of the holder, and inserting a third lens into a second lens mounting unit of the holder.

In some exemplary embodiments of the present disclosure, the method may further include pouring an adhesive between the holder and the fixture ring.

In some exemplary embodiments of the present disclosure, the image sensor may be formed with a first contact surface coated with an adhesive, the PCB is formed with a second contact surface coated with an adhesive, the first contact surface is contacted by a lower end of the fixture ring, and the second contact surface is contacted by a lower end of the holder.

In some exemplary embodiments of the present disclosure, a focal length between the lens and the image sensor may be determined by a length of the fixture ring, a thickness of the image sensor and a thickness of the first contact surface.

In some exemplary embodiments of the present disclosure, the adhesive coated on the first contact surface may be epoxy resin, with thickness thereof being in the range of 0.05~0.02 mm.

In some exemplary embodiments of the present disclosure, the adhesive coated on the second contact surface may be epoxy resin, with thickness thereof being in the range of 0.02~0.04 mm.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
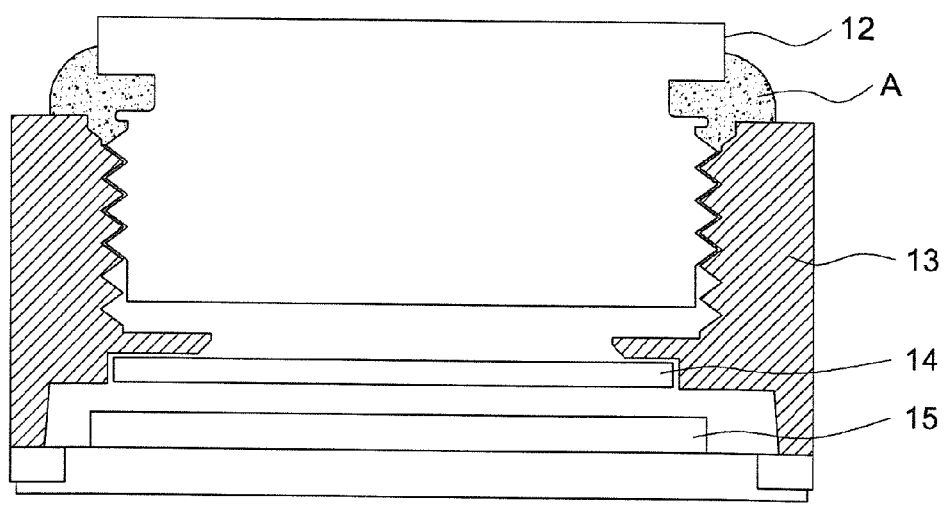
FIG. 1 is a cross-sectional view of a camera module according to prior art.

The suffixes 'module' and 'unit' may be used for elements in order to facilitate the disclosure. Significant meanings or roles may not be given to the suffixes themselves and it is understood that the 'module' and 'unit' may be used together or interchangeably.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

Figure 2:
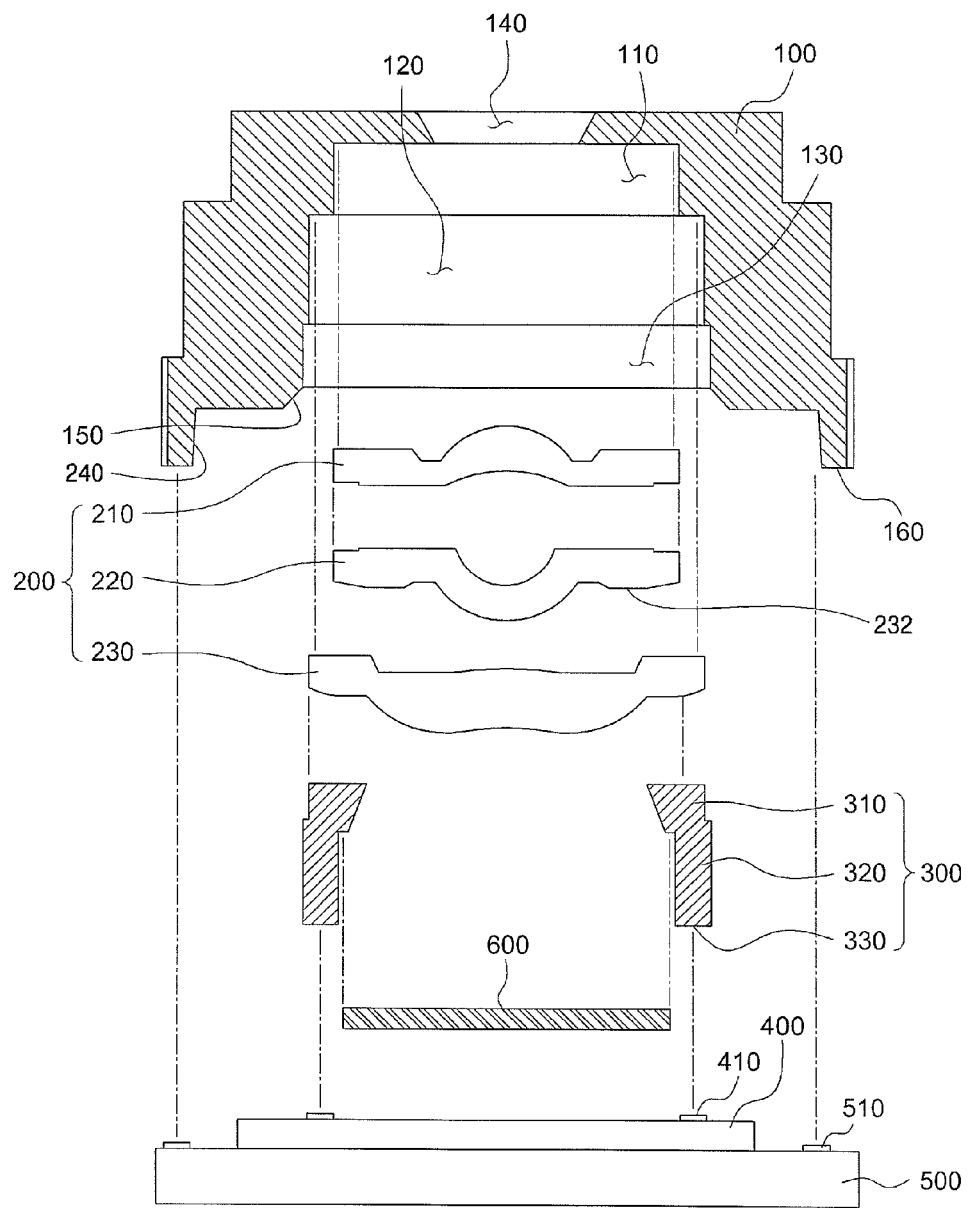
FIG. 2 is an exploded view illustrating a camera module according to an exemplary embodiment of the present invention.
Figure 3:
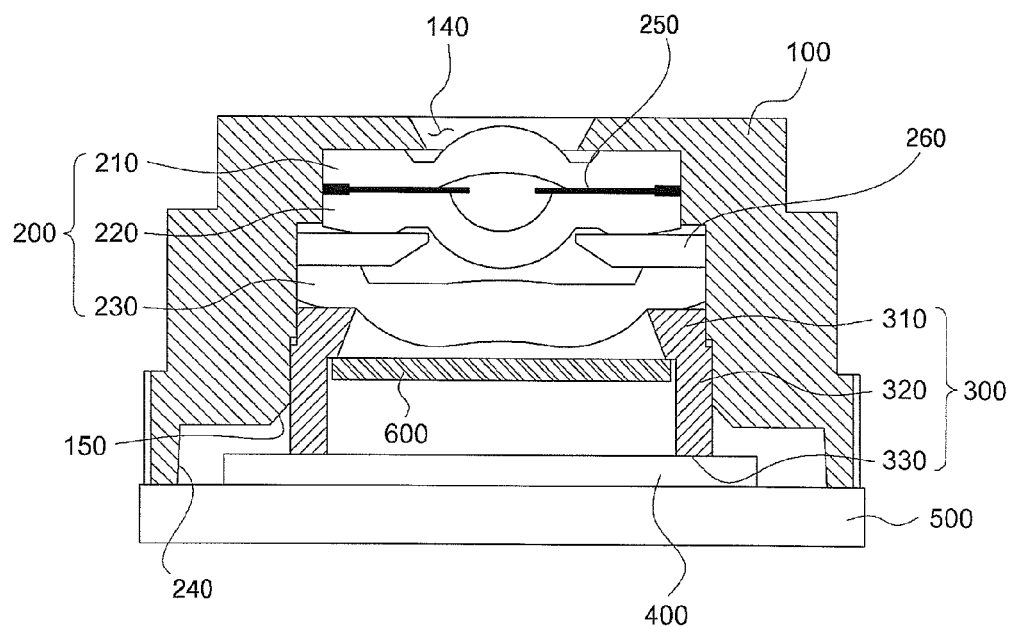
FIG. 3 is a coupled cross-sectional view of a camera module according to an exemplary embodiment of the present invention.
Figure 4:
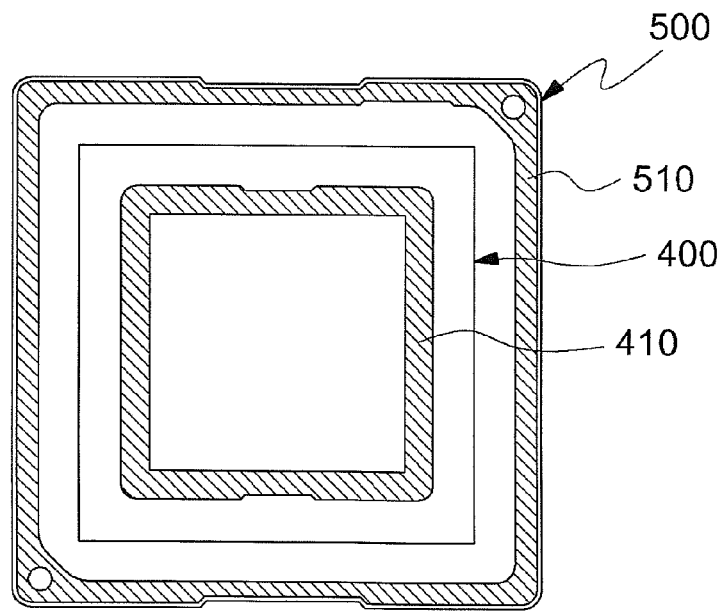
FIG. 4 is a plan view of a camera module according to an exemplary embodiment of the present invention.

FIG. 2 is an exploded view illustrating a camera module according to an exemplary embodiment of the present invention, FIG. 3 is a coupled cross-sectional view of a camera module according to an exemplary embodiment of the present invention, and FIG. 4 is a plan view of a camera module according to an exemplary embodiment of the present invention.

A camera module according to an exemplary embodiment of the present invention may include a holder 100, a lens or more lenses 200 inserted into the holder 100, a fixture ring 300 inserted into the holder for fixing the lenses 200, and a PCB (500, Printed Circuit Board) coupled to the holder 100 for mounting an image sensor 400.

The holder 100 is formed at one side thereof with an optical transmission hole 140 through which light passes, with the other side of the holder being opened. A distal end 160 of the opened other side is fixed by the PCB (500, Printed Circuit Board). The holder is provided therein with lens mounting units 110, 120 on which one or more lenses are mounted, and a fixture ring mounting unit 130 mounted with a fixture ring 300.

The lens mounting units 110, 120 may take the same shape as an external surface of the lens 200 so as to allow an external surface of the lens 200 to be contacted, and the fixture ring mounting unit 130 may take the shape of a polygon so as to allow a polygonal external surface of the fixture ring 300 to be inserted. For example, each of the lens mounting units 110, 120 may take the shape a circle, and the fixture ring mounting unit 130 may take the shape of a square. Furthermore, the holder 100 may be provided thereunder with an image sensor accommodator 240 for encompassing the image sensor 400 by expanding to the external side.

The lens mounting units 110, 120 may include a first lens mounting unit 110, and a second lens mounting unit 120 having a diameter larger than that of the first lens mounting unit 110. The lens 200 may include a pair of first lens 210 and second lens 220 to be inserted into the first lens mounting unit 110, and a third lens 230 to be inserted into the second lens mounting unit 120. At this time, the number of lenses 200 may be changed, and each diameter of the first lens mounting unit 110 and the second lens mounting unit 120 may be different based on each diameter of lenses.

The first lens 210 and the second lens 220 may have the same size of diameter for being inserted into the first lens mounting unit 110, and a first support member 250 may be interposed between the first lens 210 and the second lens 220 so that the two lenses 210, 220 can be discretely disposed therebetween. The first lens 210 is preferably a convex lens and the second lens 220 is preferably a concave lens.

In a case the first lens mounting unit 110 is inserted by the first lens 210 and the second lens 220, a focal length (distance) between the lens 200 and the image sensor 400 can be appropriately maintained to dispense with a separate adjustment of focal length.

The third lens 230 formed with a diameter larger than that of the first lens 210 and the second lens 220 is inserted into the first lens mounting unit 120. The third lens 230 may take the shape of an oval lens, and is formed at a lower external circumference thereof with a fixture ring contact unit 232 which an upper end of the fixture ring 300 contacts.

A second support member 260 is interposed between the second lens 220 and the third lens 230 for supporting the first and second lenses 220, 230.

The fixture ring 300 may be disposed between a lower surface of the third lens 230 and an upper surface of the image sensor 400 to maintain a state of the lens 200 being inserted into the holder 100, and may be formed in a through shape so as to allow an optical signal of captured image to be transmitted to the image sensor 400.

The upper external surface of the fixture ring 300 may take the same shape as that of an inner surface of the second lens mounting unit 120 so as to be inserted into the second lens mounting unit 120, and a lower external surface of the fixture ring 300 may take the same polygonal shape as that of an inner surface of the fixture ring mounting unit 130 so as to be inserted into the fixture ring mounting unit 130.

Furthermore, an adhesive is poured to glue the fixture ring 300 and an inner surface of the holder 100, after the fixture ring 300 is inserted into the fixture ring mounting unit 130 of the holder 100, where a lower end of the fixture ring mounting unit 130 is formed with a tapered-off infusion unit 150 to facilitate the adhesive to be easily poured. The fixture ring 300 is inserted by an IR (Infrared ray) filter 600 to prevent the infrared from entering the image sensor 400.

The image sensor 400 is a semiconductor device having a function of capturing an image of an object or a man, and captures an image by converting an optical signal of the image captured by the lens 200 to an electrical signal. The image sensor 400 is formed at an upper circumferential surface with a first contact surface 410 coated with an adhesive so that a lower end 330 of the fixture ring 300 can be glued.

A focal length (distance) between the lens 200 and the image sensor 400 may be determined by a height of the fixture ring 300, a thickness of the image sensor 400 and a thickness of a first contact surface 410. The focal length maintains the thickness of the first contact surface 410 to allow the focal length to be maintained at a predetermined distance, whereby a separate focal adjustment is dispensed with, which provides an advantage to the assemblage.

The PCB 500 is mounted thereon with the image sensor 400, and the image sensor 400 is circumferentially provided with a second contact surface 510 to be contacted by a lower end 160 of the holder 100. The second contact surface 510 may be coated with an adhesive to fix the holder 100, or may be provided with a separate fixing means to be fixed at the PCB 500.

Thus, the holder 100 can advantageously function as a holder and a lens barrel of the conventional camera module as well, to reduce occurrence of defects caused by black spots resultant from foreign objects during threaded coupling between the holder and the lens barrel and to simplify the manufacturing process.

Now, a manufacturing method of a camera module thus configured according to the foregoing description will be described.

First of all, the first lens mounting unit 110 of the holder 100 is inserted by the first lens 210 and the second lens 220. At this time, the first support member 250 maintains a mutually discrete distance between the first lens 210 and the second lens 220.

In a case the lens insertion is completed, the fixture ring 300 is inserted into the holder 100. Successively, the upper external surface 310 of the fixture ring 300 is inserted into the second lens mounting unit 130 to be supported at the lower surface of the third lens 230, and the lower external surface 320 of the fixture ring 300 is inserted into the fixture ring mounting unit 130 of the holder 100.

Furthermore, an adhesive is poured through the infusion unit 150 formed at the holder 100 to bond and fix the holder 100 and the fixture ring 300. The IR filter 600 is inserted into and fixed at the fixture ring 300. The first contact surface 410 of the image sensor 400 and the second contact surface 510 of the PCB 500 are coated with adhesive.

In a case, the lower end of the fixture ring 300 is attached to the first contact surface 410 of the image sensor 400, and the lower end of the holder 100 is attached to the second contact surface of the PCB 500, the assembly is completed.

At this time, the adhesive for attaching the lower end 330 of the fixture ring 300 to the first contact surface 410 of the image sensor 400 may be epoxy resin, where the thickness of the first contact surface 410 may be in the range of 0.05~0.02 mm. The adhesive for attaching the holder 100 and the PCB 500 may be epoxy resin, where the thickness of the second contact surface 510 may be in the range of 0.02~0.04 mm. At this time, the thickness of the first contact surface 410 and the second contact surface 510 is not necessarily limited to the given range.

The above-mentioned camera module and manufacturing method thereof according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A camera module comprising:
   a PCB (Printed Circuit Board) having an image sensor directly mounted thereon;
   a holder on the PCB, wherein one side of the holder is formed with an optical transmission hole and the other side of the holder is opened; and the holder comprises a lens mounting portion, a fixture ring mounting portion, and a tapered-off infusion portion formed at a bottom surface of the fixture ring mounting portion and configured to pour in an adhesive;
   at least one lens disposed in the lens mounting portion; and
   a fixture ring, wherein a lateral surface of the fixture ring is fixed to an inner surface of the holder by the adhesive poured through the infusion portion, wherein an upper surface of the fixture ring supports a bottom surface edge of the lens nearest to the image sensor, wherein a bottom surface of the fixture ring is directly fixed to an upper surface of the image sensor, wherein the fixture ring comprises a filter seating portion having a filter mounted therein and comprising a first region formed at an upper surface thereof and a second region formed at a lower surface thereof, wherein the first region of the filter seating portion has a tapered-off shape such that an inner opening of the first region becomes narrower as a distance from the image sensor increases, wherein the second region of the filter seating portion has a width that is greater than that of the first region of the filter seating portion, and wherein the image sensor is disposed between the fixture ring and the PCB.

2. The camera module of claim 1, wherein the lens mounting portion comprises a first lens mounting portion and a second lens mounting portion, and wherein a diameter of the second lens mounting portion is larger than a diameter of the first lens mounting portion.

3. The camera module of claim 2, wherein the at least one lens comprises a first lens and a second lens inserted into the first lens mounting portion, and a third lens inserted into the second lens mounting portion.

4. The camera module of claim 1, wherein the lens mounting portion has a circular shape, and wherein the fixture ring mounting portion has a polygonal shape.

5. The camera module of claim 4, wherein an upper external surface of the fixture ring has a circular shape so as to be inserted into the lens mounting portion, and a lower external surface of the fixture ring has a polygonal shape so as to be inserted into the fixture ring mounting portion.

6. The camera module of claim 1, wherein the image sensor comprises a contact surface on an upper surface thereof to which a lower surface of the fixture ring is fixed, wherein a focal length between the at least one lens and the image sensor is determined by a thickness of the fixture ring, a thickness of the image sensor and a thickness of the contact surface.

7. The camera module of claim 1, comprising at least two lenses, wherein the camera module further comprises at least one support member disposed among the at least two lenses.

8. The camera module of claim 1, wherein the filter is an IR (Infrared) cut-off filter.

9. The camera module of claim 1, wherein the fixture ring is configured to support the at least one lens at a position such that the fixture ring does not interfere with an effective diameter of the at least one lens.

10. The camera module of claim 1, wherein the infusion portion has a tapered-off shape and is formed at a corner connecting a bottom surface of the holder and the inner surface of the holder, and wherein the infusion portion is spaced apart from both the image sensor and the fixture ring.

11. A manufacturing method of a camera module, the method comprising:

mounting an image sensor directly on a PCB (Printed Circuit Board);

inserting at least one lens into a lens mounting portion of a holder;

inserting a fixture ring into a fixture ring mounting portion of the holder to support a bottom surface edge of the lens nearest to the image sensor;

fixing the fixture ring at an inner surface of the holder by an adhesive poured through a tapered-off infusion portion of the holder, wherein the infusion portion has a tapered-off shape and is formed at a corner connecting a bottom surface of the holder and the inner surface of the holder, and wherein the infusion portion is spaced apart from both the image sensor and the fixture ring;

fixing an IR (Infrared) filter in a filter seating portion of the fixture ring;

fixing the fixture ring to the image sensor of the PCB; and fixing the holder to the PCB.

12. The method of claim 11, wherein the lens mounting portion comprises a first lens mounting portion and a second lens mounting portion, and wherein the step of inserting the at least one lens into the lens mounting portion comprises inserting three lenses, specifically, inserting first and second lenses into the first lens mounting portion and inserting the third lens into the second lens mounting portion.

13. The method of claim 11, wherein fixing the fixture ring to the image sensor of the holder comprises pouring an adhesive between the image sensor and the fixture ring.

14. The method of claim 11, wherein the image sensor comprises a first contact surface coated with a first adhesive, wherein the PCB comprises a second contact surface coated with a second adhesive, wherein the first contact surface is contacted by a lower end of the fixture ring, and wherein the second contact surface is contacted by a lower end of the holder.

15. The method of claim 14, wherein a focal length between the at least one lens and the image sensor is determined by a thickness of the fixture ring, a thickness of the image sensor, and a thickness of the first contact surface.

* * * * *